(12) United States Patent
Galgano

(10) Patent No.: US 7,945,549 B2
(45) Date of Patent: May 17, 2011

(54) ELECTRICAL OR ELECTRONIC CABLE SYSTEM DESIGN TOOL

(75) Inventor: Richard G. Galgano, Naperville, IL (US)

(73) Assignee: Windy City Wire cable and Technology Products, LLC, Bolingbrook, IL (US)

( * ) Notice: Subject to any disclaimer, the term of this patent is extended or adjusted under 35 U.S.C. 154(b) by 969 days.

(21) Appl. No.: 11/766,429

(22) Filed: Jun. 21, 2007

(65) Prior Publication Data

US 2007/0245255 A1 Oct. 18, 2007

(51) Int. Cl.
*G06F 7/00* (2006.01)
*G06F 17/30* (2006.01)
*G06F 17/21* (2006.01)

(52) U.S. Cl. ........ 707/705; 707/803; 707/805; 715/274; 715/700; 715/711

(58) Field of Classification Search ........... 707/999.001, 707/999.002, 999.003, 999.104, 705, 803, 707/805; 715/274, 700, 711
See application file for complete search history.

(56) References Cited

U.S. PATENT DOCUMENTS

| | | | | |
|---|---|---|---|---|
| 5,895,455 A * | 4/1999 | Bellinger et al. | ............ | 715/210 |
| 6,714,209 B2 * | 3/2004 | Van Valer | ...................... | 715/708 |
| 7,433,860 B1 * | 10/2008 | Quint | .................... | 707/999.104 |
| 2007/0234205 A1 * | 10/2007 | Lloyd et al. | .................... | 715/520 |
| 2009/0106649 A1 * | 4/2009 | Nose | ............................ | 715/243 |
| 2009/0132495 A1 * | 5/2009 | Futatsugi | .......................... | 707/3 |
| 2009/0138812 A1 * | 5/2009 | Ikedo et al. | ................... | 715/769 |

* cited by examiner

*Primary Examiner* — Vincent Boccio
(74) *Attorney, Agent, or Firm* — Monkus McCluskey, LLC; Jefferson Perkins

(57) ABSTRACT

A computer-assisted design tool for identifying, specifying, ordering, pulling, connecting and labeling one or more types of electrical cable at a job site uses a job plan as a primary organizing concept. The job plan has one or more applications for which the cable is to be provided and one or more device types to which one of several possible cable types is to be connected. Each device type is associated with one or more locations at which the identified device is located at the site. For each location, a cable length and number of pulls are specified, and a markup legend code is stored to show how the cable length should be marked up to indicate the location to which the cable length is to be connected. The design tool automatically generates markup legend images based on the stored markup codes and enables the user to order all cable requirements for the job over the Internet. The tool also generates comprehensive documentation for the job to be installed, including box labels and wire tags.

3 Claims, 21 Drawing Sheets

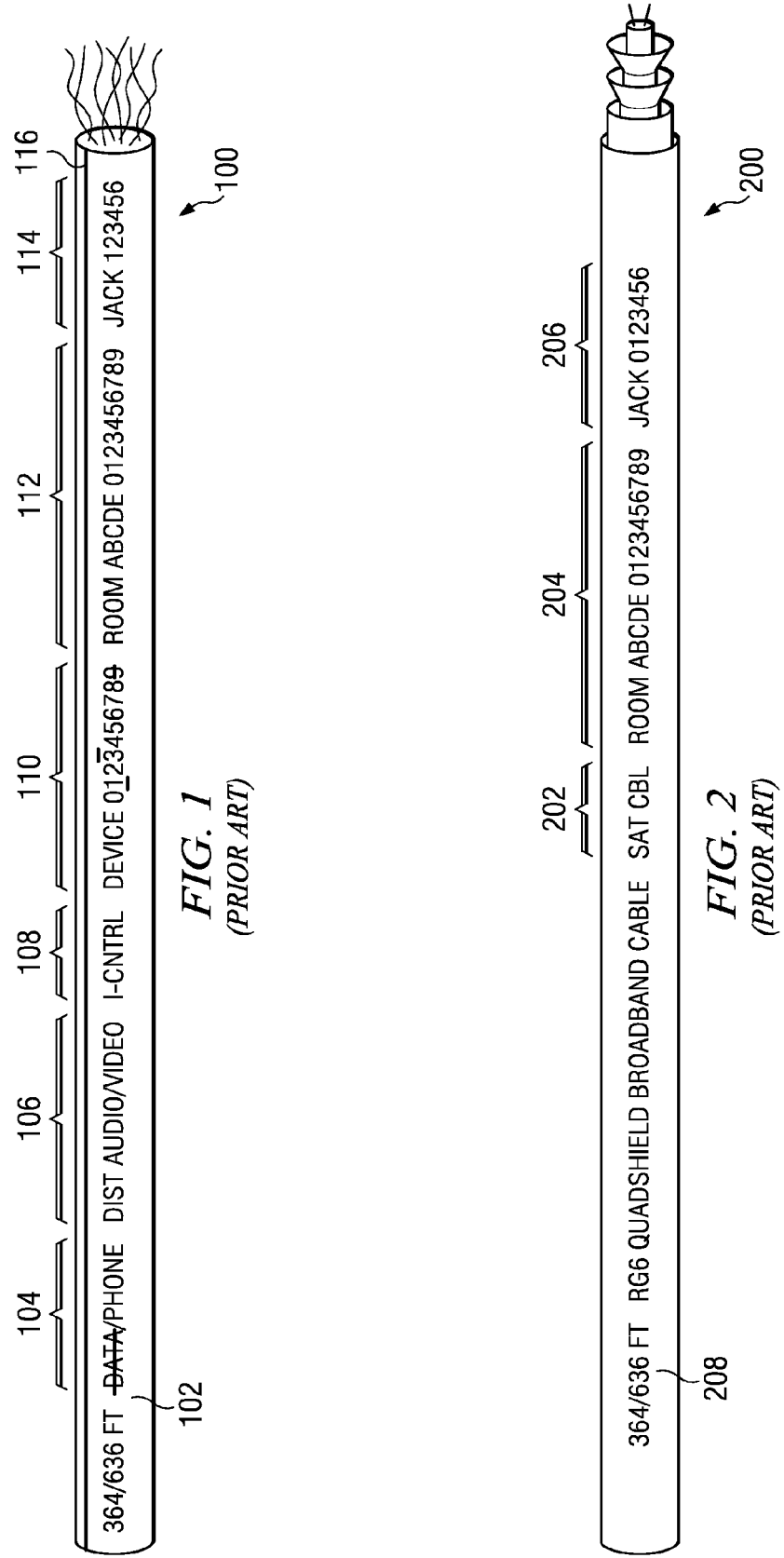

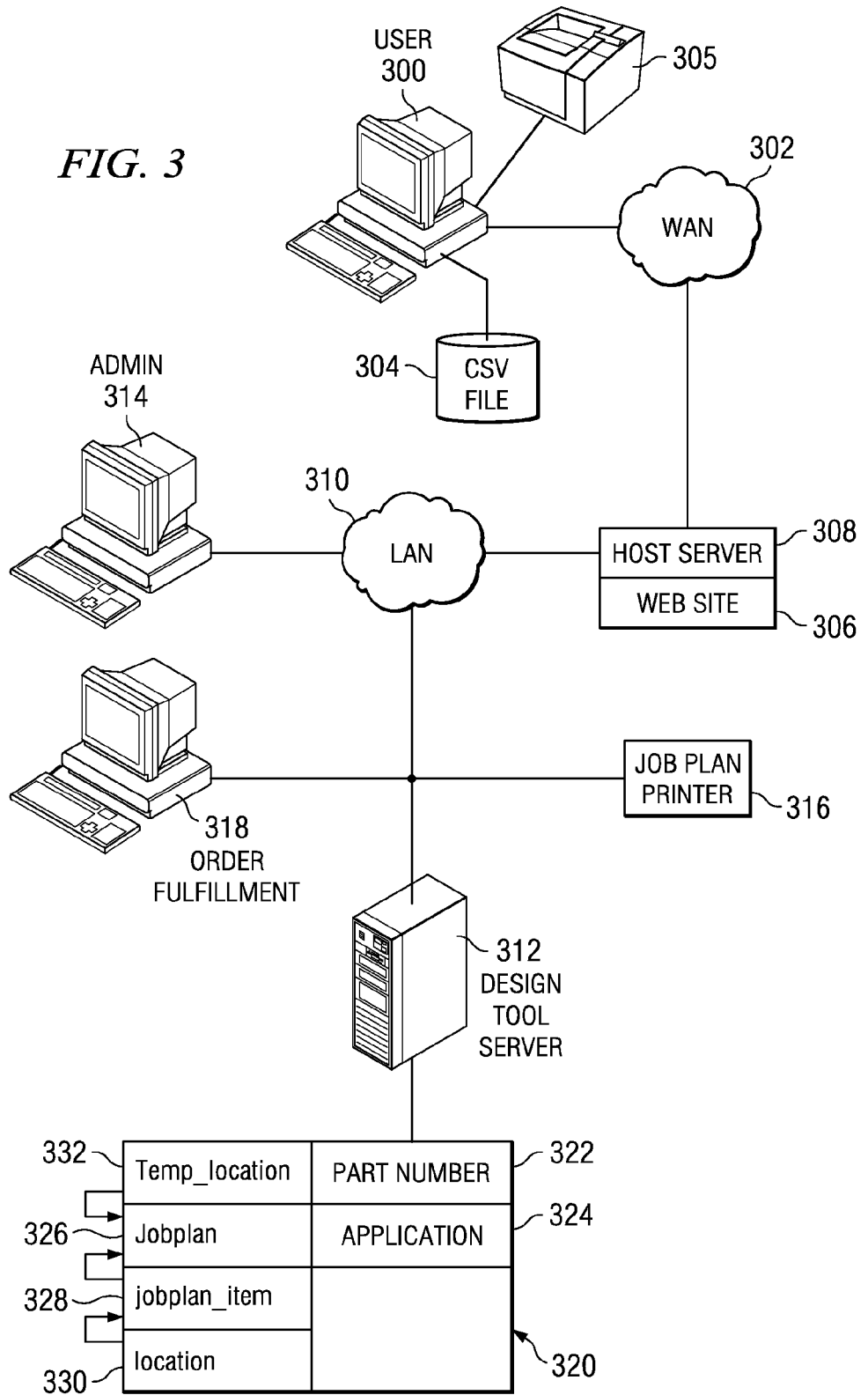

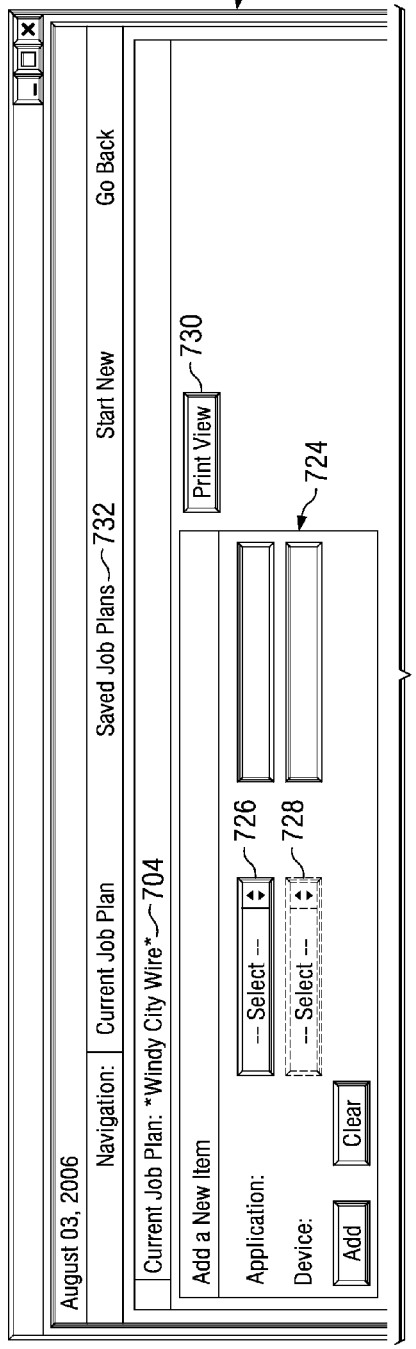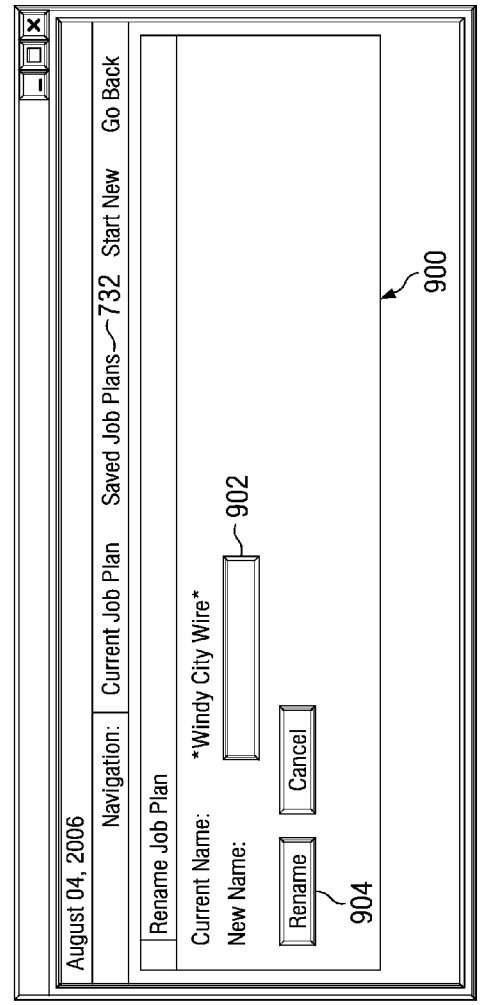

FIG. 7B

FROM FIG. 7A

Current Items

| Application | Device | PN# | AWG | Cond | Shield | Plenum | Jacket | Stripe Locations | | |
|---|---|---|---|---|---|---|---|---|---|---|
| Video | PVID/RMC | 8775600-B | 23 | 4Pr | no | no | gray | none | Add/View | ▲▼ ✎ |
| | | Notes: CAT 6 | | | | | | | | |
| Audio | PVID/RMC | 8775600-10B | 23 | 4Pr | no | no | white | none | Add/View | ▲▼ ✎ |
| | | Notes: CAT 6 | | | | | | | | |
| Video Back/Spare | PVID/RMC | 87756050-B | 23 | 4Pr | no | no | purple | none | Add/View | ▲▼ ✎ |
| | | Notes: CAT 6 | | | | | | | | |
| Phone | Phone Port | 86656130-B | 24 | 4Pr | no | no | yellow | none | Add/View | ▲▼ ✎ |
| | | Notes: CAT 5 E 100 Mhz | | | | | | | | |
| CATV | CATV Port | 8606QUAD-B | RG6 | 1 | Quad | no | white | none | Add/View | ▲▼ ✎ |
| | | Notes: RG 6 Quad Shield | | | | | | | | |
| Structured Wire | 4 Port Outlet | Add part number | | | | | | | Add/View | |
| Blind Control | AM-Source | 86656160-B | 24 | 4Pr | no | no | green | none | Add/View | ▲▼ ✎ |
| | | Notes: CAT 5 E 100 Mhz | | | | | | | | |

FIG. 12

Job Plan: *Windy City Wire*
Summary

| Application | Device | Part # | AWG | Cond | Shield | Plenum | Jacket | Stripe |
|---|---|---|---|---|---|---|---|---|
| Video | PVID/RMC | 8775600-B | 23 | 4Pr | no | no | gray | none |
| Audio | PVID/RMC | 8775600-10B | 23 | 4Pr | no | no | white | none |
| Video Back/Spare | PVID/RMC | 87756050-B | 23 | 4Pr | no | no | purple | none |
| Crestnet | PVID/RMC | 8180222IC-S | Combo | Combo | Combo | no | teal | none |
| | CATV Port | | | | Combo | no | teal | none |
| Structured Wire | 4 Port Outlet | 82606CAT5E-S | Combo | Multiple | Combo | yes | white | none |
| Blind Control | AM-Source | 86656160-B | 24 | 4Pr | no | no | green | none |

Enter your Locations and Addresses

Enter your location, pull, and address information below.

| Location | Pull Length (ft.) | Num. of Pulls | Wire Tag | Address |
|----------|-------------------|---------------|----------|---------|
| 1402 | 1404 ft. | 1406 | 1407 | 1408 |
| 1402 | ft. | 1406 | 1407 | 1408 |
| | ft. | | | |
| | ft. | | | |
| | ft. | | | |
| | ft. | | | |
| | ft. | | | |

Add Locations — 1410

1400

| Main | Item | Cart |

Creating New Order

| Del Ln | Item # / Description | Quantity | | Price | Site | Ship Date | Status | Extension | Weight |
|---|---|---|---|---|---|---|---|---|---|
| 1 | 761363-B 16-02 UNS SOL FPLP Ylw Stp | 6,000 | FT ▶ | 225.00000 99.97050 | MFT ▶ 01 ▶ | 02/7/2007 | Open ▶ | 1,350.00 | 174.00 |
| | FIRE ALARM – ANNUNCIATING DEVICES ◀ ▶ | | | | | | | | |
| 2 | 762361-B 18-02 UNS SOL FPLP Blk Stp | 7,000 | FT ▶ | 145.00000 80.24100 | MFT ▶ 01 ▶ | 02/7/2007 | Open ▶ | 1,015.00 | 154.00 |
| | FIRE ALARM – INITIATING DEVICES ◀ ▶ | | | | | | | | |

To Be Shipped: 2,365.00
Total Weight: 328.00

Fast Add: [ ]  Add X-Item  | Order Labels Only | Update Cart | Create Price Sheet | Check Out |

| St. Joseph Ann Arbor /—2500 | | | | 2502 ↓ | | |
|---|---|---|---|---|---|---|
| WCW# | AWG | Cond | Shield | Plenum | Jacket | Stripe |
| 002342-B | 18 | 4 | yes | yes | white | blue |

2504 → 002342-B row

Control Board — Blower (2506, 2512)

| Location | Address |  | T-Unit # 1 | tag: B 1 |
|---|---|---|---|---|
| Blower # 1 | tag: A 1 |  | T-Unit # 10 | tag: B 10 |
| Blower # 2 | tag: A 2 |  | T-Unit # 11 | tag: B 11 |
| Blower # 3 | tag: A 3 |  | T-Unit # 12 | tag: B 12 |
| Blower # 4 | tag: A 4 |  | T-Unit # 13 | tag: B 13 |
| Blower # 5 | tag: A 5 |  | T-Unit # 14 | tag: B 14 |
| Blower # 6 | tag: A 6 |  | T-Unit # 2 | tag: B 2 |

Control Board — Stations (2508, 2512)

| Location | Address |  | T-Unit # 3 | tag: B 3 |
|---|---|---|---|---|
| Station # 1 | tag: C 1 |  | T-Unit # 4 | tag: B 4 |
| Station # 2 | tag: C 2 |  | T-Unit # 5 | tag: B 5 |
| Station # 3 | tag: C 3 |  | T-Unit # 6 | tag: B 6 |
| Station # 4 | tag: C 4 |  | T-Unit # 7 | tag: B 7 |
| Station # 5 | tag: C 5 |  | T-Unit # 8 | tag: B 8 |
| Station # 6 | tag: C 6 |  | T-Unit # 9 | tag: B 9 |

Control Board — Transfer Unit (2510, 2512)

| Location | Address |
|---|---|

*FIG. 24*

| BLOWER BLOWER # 1 | BLOWER BLOWER # 6 | STATIONS STATION # 6 | TRANSFER UNIT T-UNIT # 13 | TRANSFER UNIT T-UNIT # 6 |
|---|---|---|---|---|
| BLOWER BLOWER # 1 | STATIONS STATION # 1 | STATIONS STATION # 6 | TRANSFER UNIT T-UNIT # 14 | TRANSFER UNIT T-UNIT # 6 |
| BLOWER BLOWER # 2 | STATIONS STATION # 1 | TRANSFER UNIT T-UNIT # 1 | TRANSFER UNIT T-UNIT # 14 | TRANSFER UNIT T-UNIT # 7 |
| BLOWER BLOWER # 2 | STATIONS STATION # 2 | TRANSFER UNIT T-UNIT # 1 | TRANSFER UNIT T-UNIT # 2 | TRANSFER UNIT T-UNIT # 7 |
| BLOWER BLOWER # 3 | STATIONS STATION # 2 | TRANSFER UNIT T-UNIT # 10 | TRANSFER UNIT T-UNIT # 2 | TRANSFER UNIT T-UNIT # 8 |
| BLOWER BLOWER # 3 | STATIONS STATION # 3 | TRANSFER UNIT T-UNIT # 10 | TRANSFER UNIT T-UNIT # 3 | TRANSFER UNIT T-UNIT # 8 |
| BLOWER BLOWER # 4 | STATIONS STATION # 3 | TRANSFER UNIT T-UNIT # 11 | TRANSFER UNIT T-UNIT # 3 | TRANSFER UNIT T-UNIT # 9 |
| BLOWER BLOWER # 4 | STATIONS STATION # 4 | TRANSFER UNIT T-UNIT # 11 | TRANSFER UNIT T-UNIT # 4 | TRANSFER UNIT T-UNIT # 9 |
| BLOWER BLOWER # 5 | STATIONS STATION # 4 | TRANSFER UNIT T-UNIT # 12 | TRANSFER UNIT T-UNIT # 4 | |
| BLOWER BLOWER # 5 | STATIONS STATION # 5 | TRANSFER UNIT T-UNIT # 12 | TRANSFER UNIT T-UNIT # 5 | |
| BLOWER BLOWER # 6 | STATIONS STATION # 5 | TRANSFER UNIT T-UNIT # 13 | TRANSFER UNIT T-UNIT # 5 | |

*FIG. 25*

ELECTRICAL OR ELECTRONIC CABLE SYSTEM DESIGN TOOL

BACKGROUND OF THE INVENTION

Networked devices have proliferated in businesses and residences over the past few decades. In a previous era, about the only device in a residence requiring a low-voltage communication line was an analog telephone. The needs of businesses were not much greater.

In contrast, a present-day factory, office building, hospital or educational institution will have hundreds of electronic devices of various kinds, most of which will be connected via one or more communication lines to other such devices or to central hubs or controllers. Telephones have been joined by fax machines. Computers are typically set up in a client/server architecture on a network such as Ethernet, with each personal computer, printer, scanner or other device having its own network address; the network is extended by repeaters and often includes wireless transmitters and receivers. Communications cabling is also typically supplied for HVAC, access control, audio and video feeds, remote control and other uses.

Given this large number of devices which must be connected together in a typical modern building, the specification, arrangement, addressing and identification of the electrical cables connecting them (typically, but not entirely, of low-voltage varieties) has become nontrivial. Competent installations must be done in a methodical and well-documented way; the purpose and routing of the installed cabling must be readily discernable by the installers as well as persons working with the system long after the installers have departed.

The assignee of the present invention has developed a line of low-voltage insulated cables under the mark SMART-WIRE that helps meet these requirements. Two examples of these cables are shown in FIGS. 1 and 2. These cables are labeled along their lengths with various preprinted indicia which vary by cable type. FIG. 1 shows an example of a Cat. 5E cable 100 suitable for use in Ethernet networks. At 102 the insulation jacket is printed an ascending/descending sequential foot marker which tells the installer how much cable is left on the box or reel. A data/phone designation is provided at 104, a distributed audio/video designation at 106, and an intelligent controller designation at 108. The user can mark through one of the DATA, PHONE, AUDIO, VIDEO and I-CNTRL indicia to identify the application for which this cable is being provided. In the illustrated example, DATA has been marked by marking a line through it. At 110 a device designation or address has been printed; this device designation can be used to identify the device to which the cable is to be connected. Using a "ladder" marking system, up to 999 different devices can be identified. In this illustrated example, Device No. 391 has been indicated. Similar designations identifying the location (here, a room) and the address (here, a jack) are printed at 112 and 114, respectively. The cable 100 will also be provided in a specific jacket color and color of stripe 116 to further aid users in isolating the cable from others in the job.

FIG. 2 depicts a somewhat similarly preprinted RG6 quad shield broadband cable 200. Many of the preprinted designations are the same as those used for cable 100, but some are not. The user will mark through a selected one of the SAT and CBL legends at 202 to identify use as a satellite or cable television application. Provision is made to identify the location (room) and address (jack) to which the cable is being routed, at 204 and 206, respectively, and an ascending/descending sequential foot marker is provided at 208. The illustrated cable types are representative only; other kinds of cable include echelon compliant cable, two conductor home theater cable, multiroom four-conductor audio and audio-cat cable, 2×2 structured wiring cable, temperature control cable in regular and low capacitance varieties, fire cable and security cables. Each of these cable types has a print legend which may be different from the others.

SUMMARY OF THE INVENTION

According to one aspect of the invention, a cable system design tool is provided which includes a relational database that stores, for each job of a user, a job plan. As the user lays out which applications and devices are to be connected according to the job plan, the user specifies which electrical or electronic cable types should be used to connect them, where the locations of the devices are, how long the cable run pull lengths are, and how many pulls or runs there are per location. Preferably the user also associates an address with each location. The completed job plan may be used to automatically calculate how much of each cable type is needed and to place an order for all of it on-line.

According to another aspect of the invention, the design tool also permits the user to create markup legends for subsequent application to each length of cable to be installed. A blank legend code, corresponding to a preprinted legend appearing on the jacket of the cable type, is stored in the database. This legend code is used by the system to generate a blank legend in a markup editor, which preferably appears as a component of a web page. The user is able to apply various markup indicia to selected ones of the characters in the blank legend to create a markup legend. Once the desired markup legend is created, the system stores a markup code that encodes the markup legend, preferably without actually storing the image. The stored markup code is later retrieved by the system to generate a respective markup image, which appears as a component of the job plan documentation and which may be used at the site as a guide to physically mark up the different cable lengths or runs.

According to a further aspect of the invention, data fields from the stored job plan are used to print out wire tags and/or container labels for the cable ordered from the system proprietor. The wire tags can be used to identify cable ends for installation purposes. The box or other container labels can be affixed to boxes containing the types of cable ordered from the system proprietor, and show to the installer how the cable shipped therein is to be used in the planned job. The systems integrator or other user has the ability to select which of several fields of data or attributes will be printed on the container labels and wire tags.

BRIEF DESCRIPTION OF THE DRAWINGS

Further aspects of the invention and their advantages can be discerned in the following detailed description, in which like characters denote like parts and in which:

FIG. 1 is a diagram of a Cat. 5E cable with a specific, marked-up print legend, capable of use with the system of the invention;

FIG. 2 is a diagram of an RG6 quad shield broadband cable having a blank print legend different from that shown in FIG. 1;

FIG. 3 is a schematic diagram of a web-hosted cable installation design tool;

FIGS. 7A and 7B together form a schematic and interrupted view of a main job plan page of the web site accessed from the start page shown in FIG. 5;

FIG. 9 is a schematic view of a Rename Job Plan page accessed from the saved job plans page shown in FIG. 8;

FIG. 12 is a representative and interrupted image of a first printed output according to the invention, by which a job plan summary is printed;

FIG. 14 is a schematic and interrupted view of an Enter Locations and Addresses page accessible from the start page shown in FIG. 5 and permitting an alternative method of creating a job plan;

FIG. 21 is a schematic view of a "shopping cart" page created from a completed job plan;

FIG. 24 is a schematic view of a representative box or other container label created once a user has selected the field pairs to be printed thereon; and FIG. 25 is a partial and schematic view of a representative set of wire tags created once a user has selected the field pairs to be printed on the tags.

DETAILED DESCRIPTION

Figure 4:
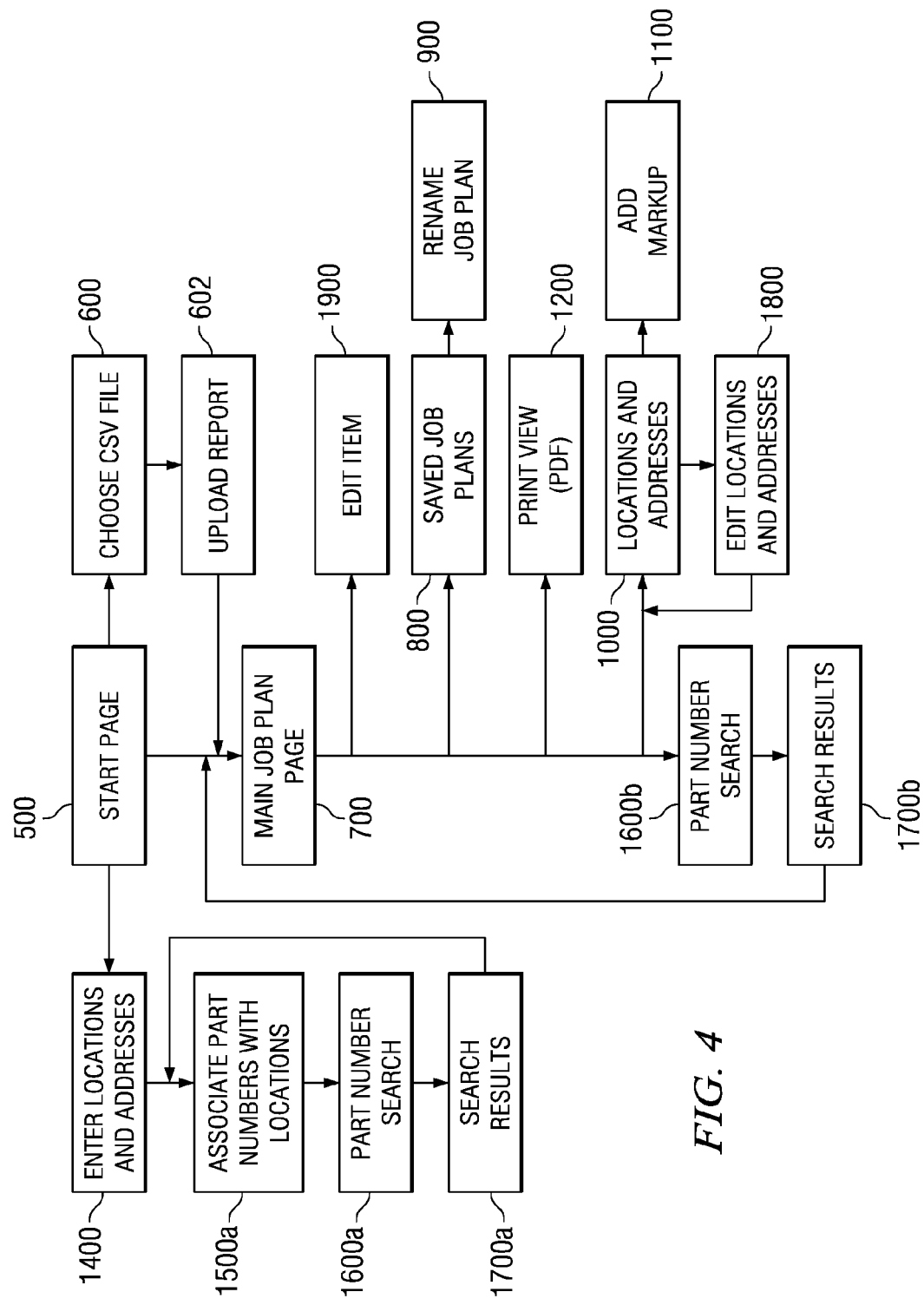
FIG. 4 is a flow diagram showing principal steps and web pages in a cable installation design process according to the invention.

A representative architecture of a system according to the invention is shown in FIG. 3. A user workstation 300 has a connection to a wide area network 302 such as the Internet. The workstation has a display and a graphical user interface such a keyboard and/or mouse. The user 300 (who can be a customer's system integrator) may store, on his or her local hard drive or other machine-readable storage medium, a csv file 304 which encodes the data of a preexisting job plan. Other than this possible csv file, the user workstation 300 can be a "thin client" and needs nothing more than a standard operating system, a spreadsheet application and a web browser to access the rest of the system according to the invention. The user workstation 300 further may have an associated printer 305 that is either directly attached to the computer 300 or via a local area network.

Through the network 302, the user interfaces with an e-commerce web site 306 installed on a host server 308. The web site 306 has several web pages which are either preexisting or which are created during the job plan creation process, as will be described below. A local area network (LAN) 310, which can be on the premises of the proprietor of the system, interconnects the host server 308 with a design tool server 312, a system administrator 314, a job plan printer 316 (shown schematically here as a single printer, but differently configured printers may be employed to print different components of an output job plan documentation) and to one or more order fulfillment workstations represented schematically by workstation 318.

The design tool server 312 (here represented as being hardware separate from host server 308, but these applications could be loaded on the same computer) has at least one processor within it which has been programmed with a computer program that implements the functionality of the system described herein. The design tool server 312 receives user data from, and outputs results to, the host server 308 and thence over the wide area network 302 to user 300. The design tool server has an associated design tool relational database 320 that preferably is organized into several tables. The software and databases used in this system conveniently are recorded on a machine-readable storage medium, such as one or more hard disks, and are loaded into a random access memory (RAM) of the server 312 at or before the time of their execution or access. Some of the tables 320 are used by all users with the appropriate security clearance, while others are accessible only by personnel of a particular customer for which the job plan is created. The tables include a job plan table 326 which contains a record of each job plan in the system, a job plan item table 328 which provides a record for each item (cable type) in any job plan, a part number table 322 which contains fields of data relating to each type of cable which the proprietor sells, and an application table 324 which contains default application and device information which may be employed by the users in creating their own job plans.

The other tables 330, 332 will typically exist in multiple sets, one set per job plan. For each job plan, the design tool 312 will create a record in the job plan table 326. A respective location table 330 will link to one job plan record in table 326 and will contain all locations for which the item is to be used. A respective temp_location table 332 is linked to one of the job plan records in the job plan table 326 and is employed whenever the user wants to fill in locations and addresses first (see step 1400, FIGS. 4 and 14) as opposed to first specifying applications and devices. The data in temp_location table 332 will not persist after the user completes the job plan.

Figure 5:
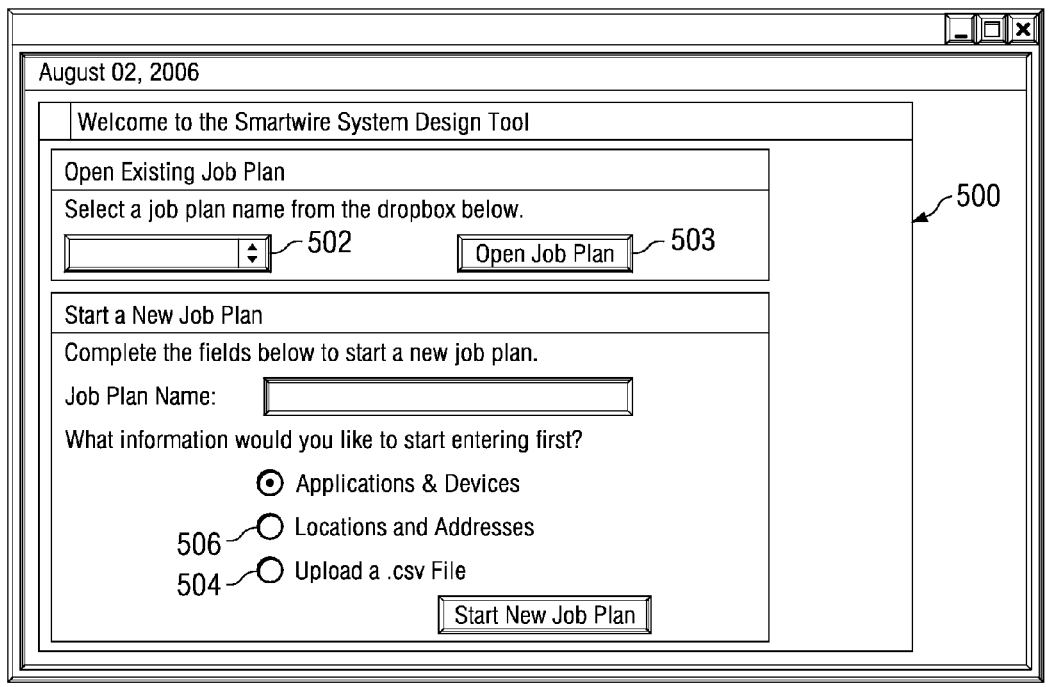
FIG. 5 is a schematic view of a start page of a web site viewed by a user at the beginning of the design process.

A flow diagram of a representative process according to the invention is shown in FIG. 4. The process starts at a start page 500, a representative image of which is schematically shown in FIG. 5. Preferably, this start page 500 is accessed by an outside user (such as a system integrator) only through an e-commerce portal of the proprietor, and then only after the user has become registered with the proprietor.

Referring to FIG. 5, the user may take any of three actions on this page. First, at 502 the user may select an existing job plan which the user had created at an earlier time from a drop-down list (not shown), and which the proprietor has stored in the proprietor's database 326. The "open job plan" button 503 will link the user to a main job plan page 700 (FIGS. 4 and 7) on which the user's job plan is displayed; FIG. 7 shows such a preexisting job plan. As used herein, a "job plan" means a set of documentation which preferably includes which cable runs are going to be used on a particular job, what type of cables they are, how they are going to be connected and to where, how long each cable is, and how each cable length or run should be marked. A completed job plan is one of the principal outputs of the invention's system design tool.

Figure 6:
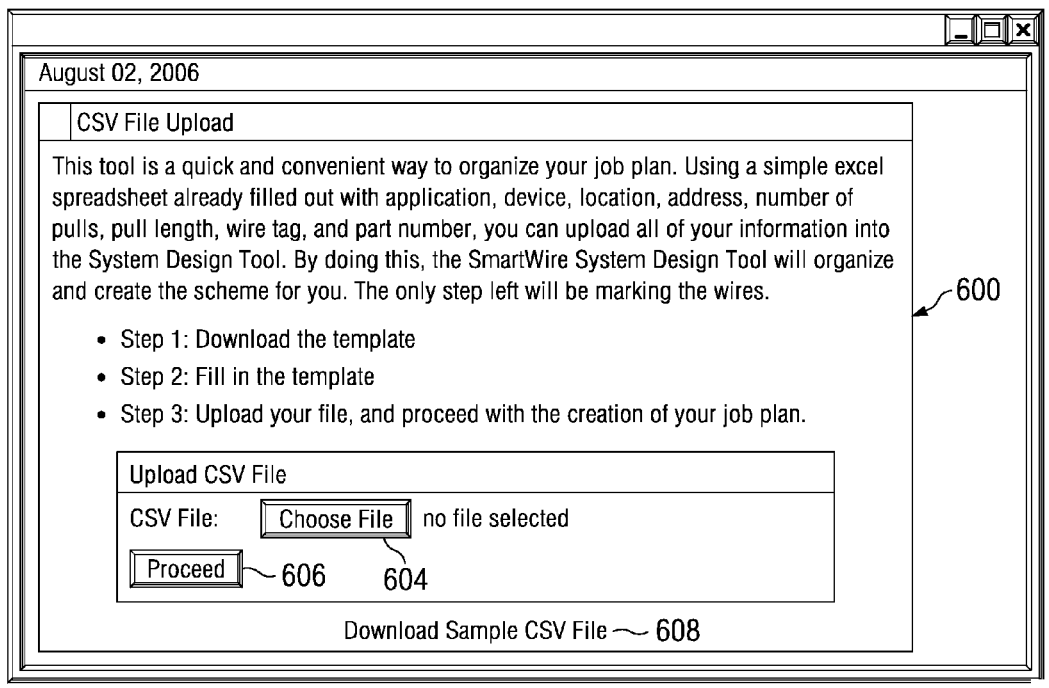
FIG. 6 is a schematic view of a CSV Upload page linked to the start page shown in FIG. 5.

Alternatively, at step 600 (FIG. 4) and by clicking on button 504 (FIG. 5) the user is transferred to a "csv upload" page 600, a representative example of which is shown in FIG. 6. Referring to FIG. 6, by clicking on "choose file" button 604, the user can browse his or her computer 300 to select a comma separated value (csv) file 304 (FIG. 3) for upload, as for example one created by the Microsoft Excel spreadsheet application. Once the user has browsed for and selected a csv file 304 for upload, at step 602 (FIG. 4) this report is uploaded by clicking on "proceed" button 606 (FIG. 6). The system 312 (FIG. 3) will then parse each line of the file (excluding the first line, which is reserved for headings) and will insert them into the database 320. The system will search the csv file for all unique application/device/part number combinations, and will create a job plan item for each such unique combination. After identifying each item, it will re-traverse the uploaded file and create locations for each line. Once the upload is complete, the user will be given a report of how many lines (if any) were not able to be imported successfully.

If the user does not yet have a csv file but wishes to create one off-line, a preferred embodiment of the system will make available to the user a template, downloadable by clicking on "Download sample csv file" link 608 (FIG. 6). From this template the user can create a csv file for later upload, which will contain the requisite data in the order which the job plan creation tool is designed to read it.

Figure 15:
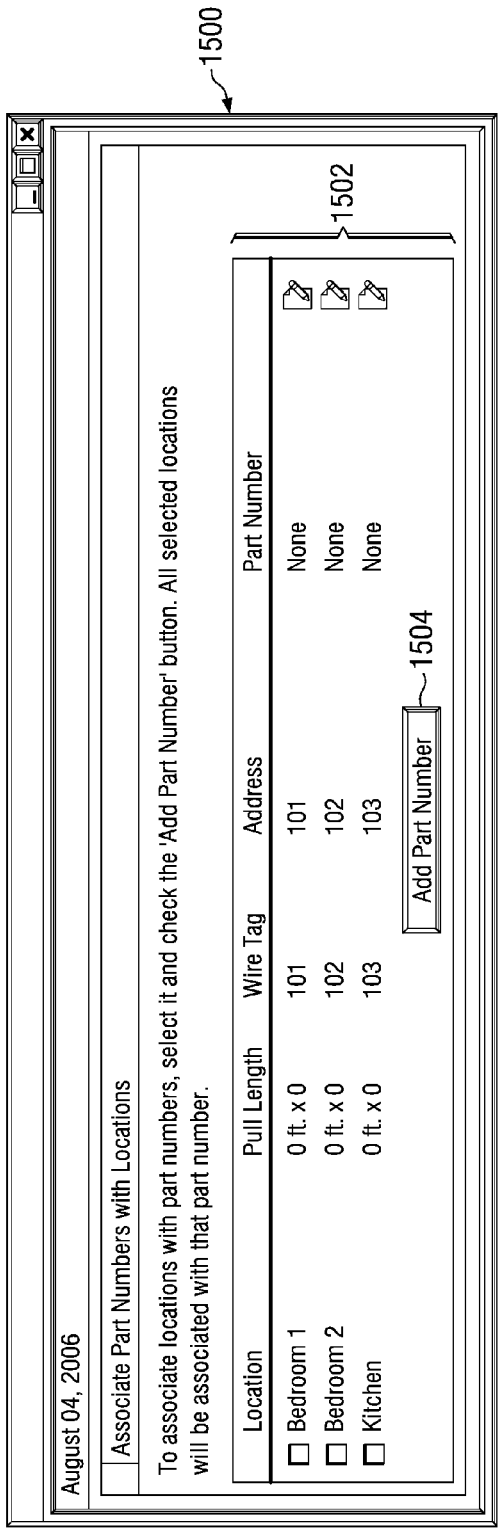
FIG. 15 is a schematic view of an Associate Part Numbers with Locations page accessible from the Enter Locations and Addresses page shown in FIG. 14.

As another alternative, at step 1400 (FIG. 4), the user may choose, by selecting button 506 on start page 500 (FIG. 5), to begin entering locations and addresses and build a job plan using this method, as opposed to entering applications and device types using the main job plan page 700 (FIGS. 7A and 7B). Clicking on button 506 causes the user to be routed to a page 1400, a representative sample of which is shown in FIG. 14. On page 1400, the user enters, on a line-by-line basis, the location 1402 to which or from which the cable run is to be pulled (the identified location typically being a location remote from a central location or other connection point), the pull length 1404 from that central point to the location 1402, the number of pulls at 1406 (several lengths or runs of the same kind of cable can be pulled to a particular remote location), the wire tag at 1407, and the address at 1408 which is to be associated with the location 1402. Upon clicking on "add locations" button 1410, the user's information is stored in the temp_location table 332 (FIG. 3) and the user is transferred to a page 1500 (FIG. 15) at which the user associates a part number (a serial number uniquely identifying a particular kind of cable; similar to a SKU) with each of the locations the user has written into the data at page 1400.

Figure 16:
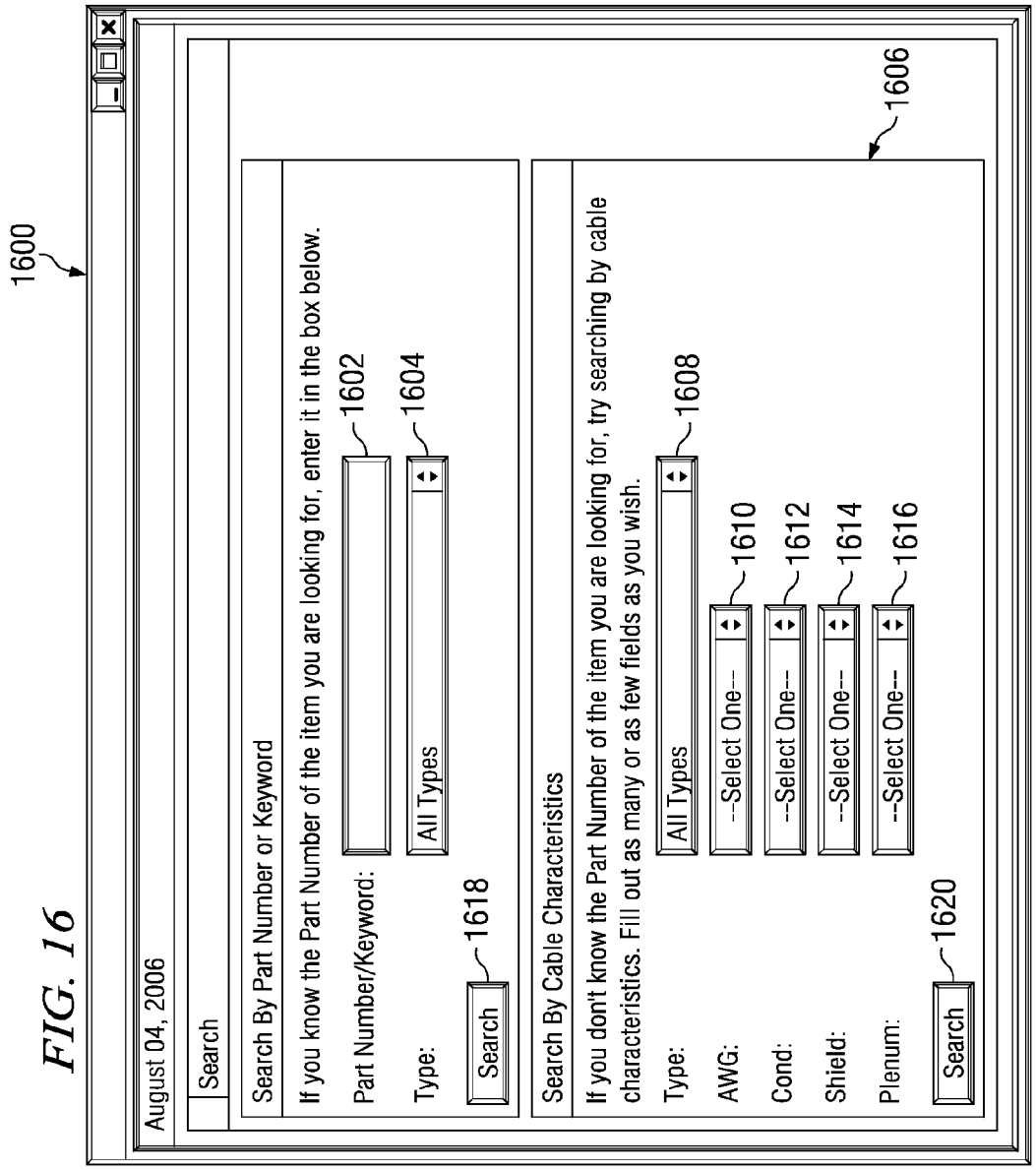
FIG. 16 is a schematic view of a part number search page accessible from either the main job plan page shown in FIGS. 7A and 7B or the Associate Part Numbers with Locations page shown in FIG. 15.

Page 1500 displays at 1502 a list of all the locations the user entered on page 1400. The user may then select one or more locations by highlighting different lines in the table 1502. The user then clicks on "add part number" button 1504, to be transferred at 1600a (FIG. 4) to a part number search page 1600 (an example of which is schematically shown in FIG. 16) to associate a part number with the chosen location. A part number uniquely identifies a type of cable which the proprietor is offering for sale. If the user happens to know the part number, this can be entered at 1602. If the user does not know the proprietor's part number but knows the cable type, he or she can select it from a drop-down list which will appear at 1604. If the user does not know either of these, alternatively he or she can enter such cable characteristics as are searchable in the search box 1606. In the illustrated embodiment, a particular cable or part number can be searched by classification or type at 1608, size (in AWG) at 1610, number of conductors at 1612, the presence or absence of a coaxial shield at 1614, and the presence or absence of a plenum at 1616.

Figure 17:
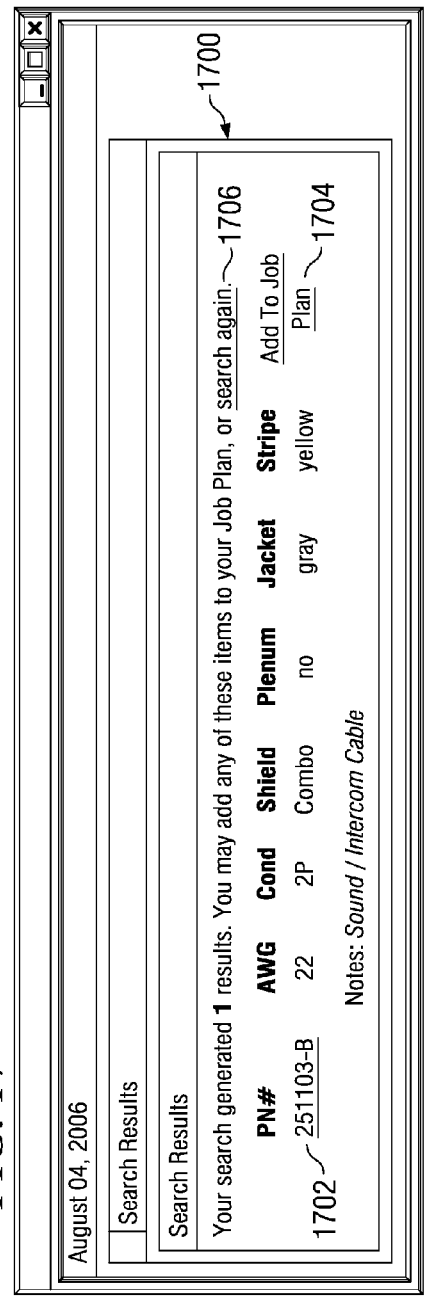
FIG. 17 is a schematic view of a search results page resulting from a search initiated at the page shown in FIG. 16.

Pressing search buttons 1618 or 1620 will send (at 1700a, FIG. 4) the user to a part number query result page 1700, an example of which is shown in FIG. 17. The user may select one of the retrieved part numbers 1702 (only a representative one of which is shown here) by clicking on "add to job plan" link 1704, which will fill a "partnumber" field in the temp_location table 332 (FIG. 3) and will return the user to the job plan he or she is building at page 1500 for further part number association. Alternatively, if the search results don't turn up any useful hits, the user can return to the search page 1600 by clicking on "search again" legend 1706. Once all locations and addresses have had part numbers associated with them, the user can move on.

In FIG. 17, when the "add to job plan" legend 1704 is clicked, the system 312 (FIG. 3) creates a job plan item for each unique part number found in the temp_location table 332 with a default application and device. A location is then created for each entry in the temp_location table 332 having a corresponding part number. Once all the data have been exported, the temp_location table 332 is cleared.

Main job plan page 700 (FIGS. 4, 7A and 7B) displays all of the job plan items 702 (FIG. 7B) within the current job plan 704 (FIG. 7A). Each item or cable type 702 is displayed in order of its "sort" value from the database 320 (FIG. 3). This order can be adjusted with the up/down buttons 706 next to each item 702. If an item has a part number 1702 (see FIG. 17) associated with it, the characteristics of the cable identified by the part number 1702 are shown, in the illustrated embodiment including wire size 708, number of conductors 710, the presence or absence of a shield or plenum at 712 and 714, and jacket and stripe colors at 716 and 718. If the part number 1702 has not yet been associated with the item, a link 719 will be shown instead. Clicking on the link 719 (FIG. 7B will transfer the user to page 1500 (see FIG. 15), permitting the user to search at 1600b (FIGS. 4 and 16) for the part he or she wants. The user will select one of the retrieved, part number-identified cable types at step 1700b and will be returned to the main job plan page 700.

Figure 19:
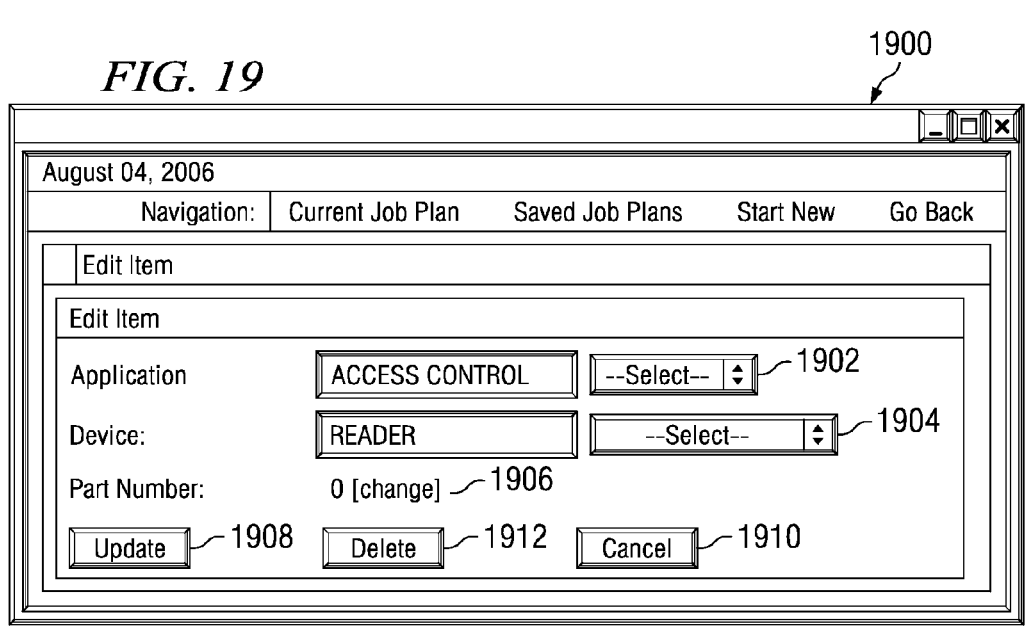
FIG. 19 is a schematic view of an Edit Application and Devices page, accessible from the main job plan page shown in FIGS. 7A and 7B.

Also as seen in FIG. 7B, each item 702 is furnished with an edit icon 720 that allows a user to change information about that item. This will update values in the database and will allow the user to search for a new part number to associate with the item. An edit page 1900, an example of which is shown schematically by FIG. 19, will allow the user to modify the information associated with an item or to delete the item altogether. At 1902, the user may select one of a set of predetermined applications from a drop down list, and at 1904 may select one of a set of predetermined devices from another drop down list. At 1906, the user may modify the part number associated with the item. Any changes are implemented by clicking on "update" button 1908. Button 1910 permits the user to abort the changes, and button 1912 permits the user to delete the item altogether. Clicking on any of these buttons 1908-1912 will return the user to the main job plan page at FIGS. 7A-7B, which will have been updated with the changes.

Returning to FIG. 7A, a dialog box 724 near the top of the page allows for the creation of new items (cable types being used within a particular application or system) by specifying an application 726 and a device type 728. Clicking on buttons 726 or 728 will cause drop down lists to appear, which are populated first with default values from the application table 324 (FIG. 3), then all applications and device types from other items in the current job plan. Each item entry 702 has a an "add/view" link 722 which takes the user to the add locations and addresses page 1000 (seen in FIG. 10).

Figure 10A:
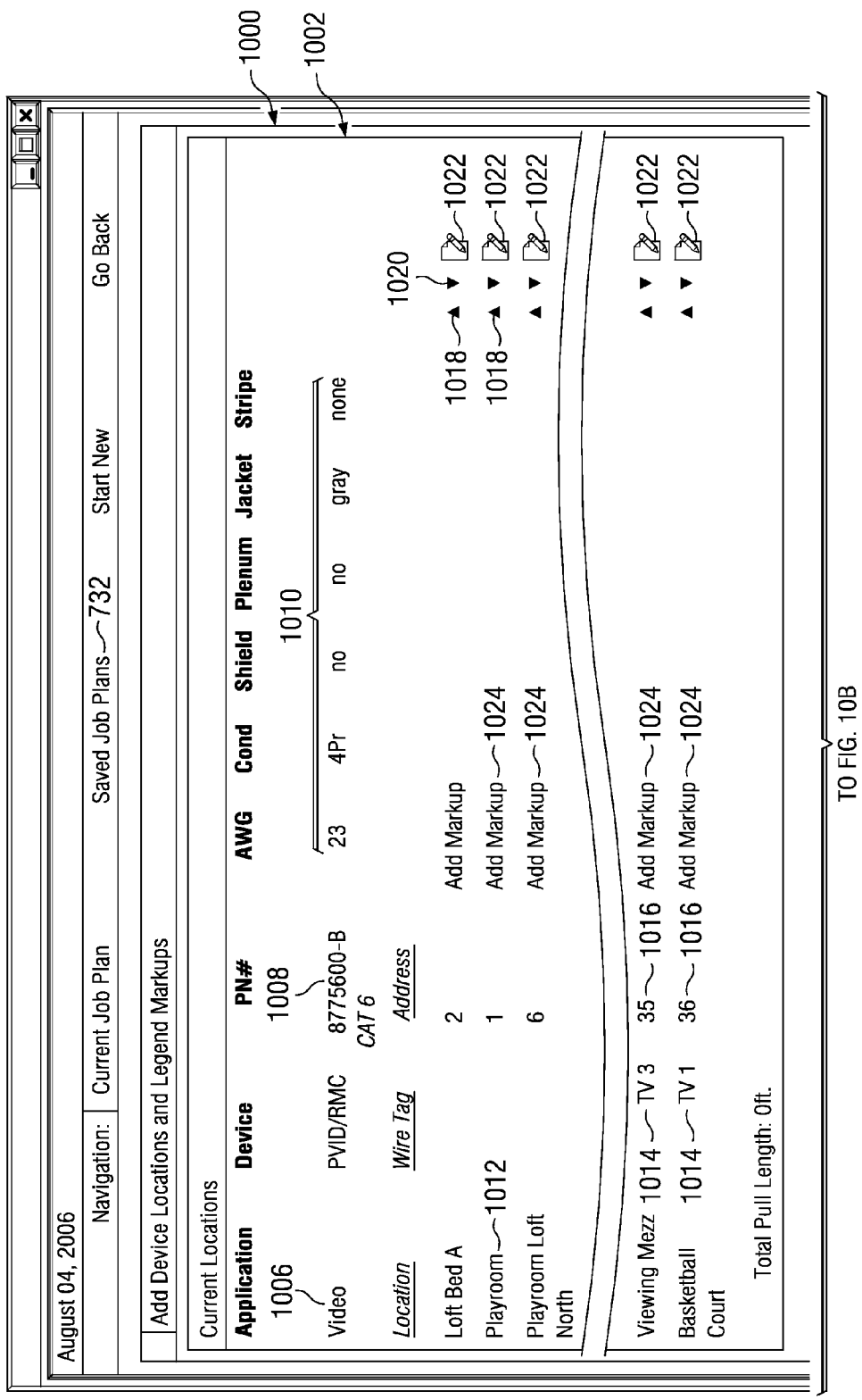
FIGS. 10A and 10B together form a schematic and interrupted view of an Add Devices, Locations and Markups page that is accessed from the main page shown in FIGS. 7A and 7B.
Figure 10B:
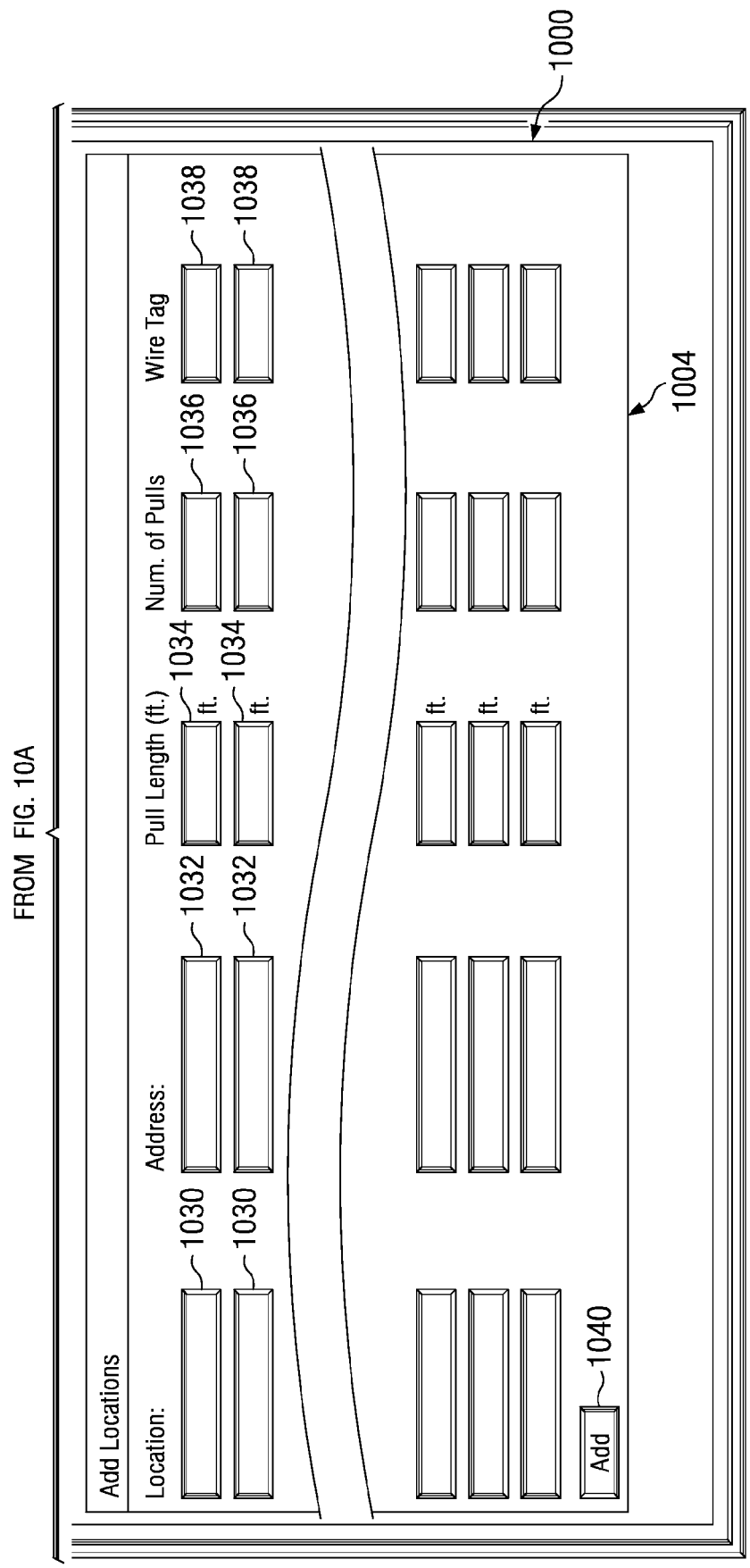

Referring to FIGS. 10A and 10B, the locations and addresses page 1000 displays all of the current locations in a table 1002, followed by a template 1004 (FIG. 10B) for adding further locations. At 1006 (FIG. 10A) there is shown a header that sets forth the information about one application/device type combination, specifying at this point the cable type or part number at 1008 and associated conductor size, number of conductors, presence or absence of a shield and plenum, jacket color and stripe color in respective fields 1010, and the type of device to which the specified cable type will be connected. This application/device header 1006 is followed by a comprehensive listing of every location 1012 to which this type of cable, and for this purpose or device type, is to be pulled. Each location 1012 is identified by a name and may have a wire tag 1014 associated with it. The address associated with the location (e.g. a particular jack, door or window within a room) is given at 1016. Up and down arrows 1018, 1020 can be used to change the displayed order.

Figure 18:
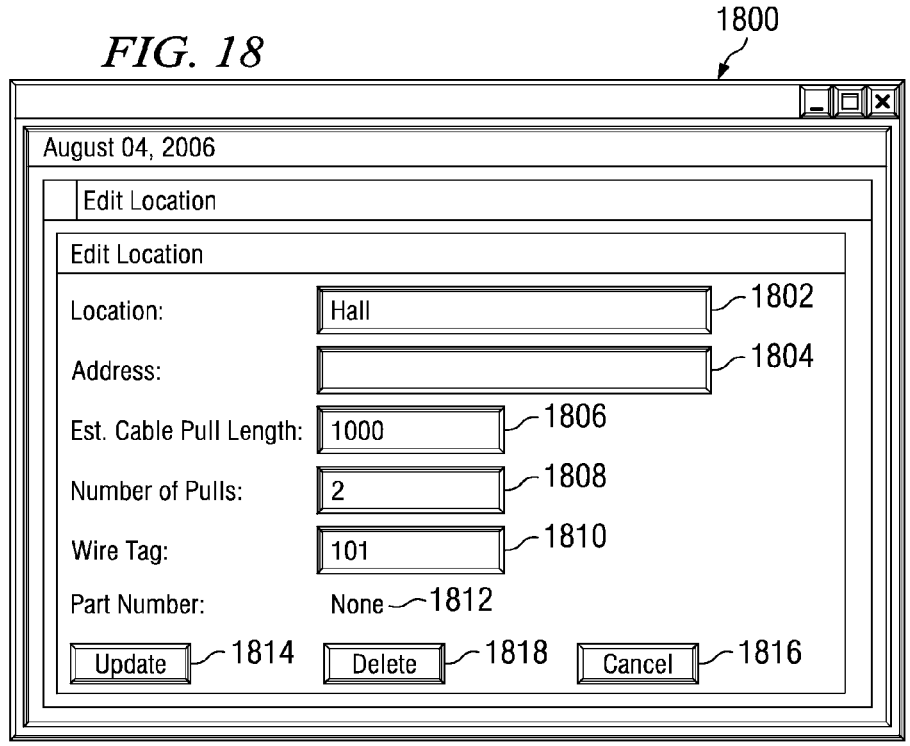
FIG. 18 is a schematic view of an Edit Location page accessible from the Enter Locations and Addresses page shown in FIG. 14.

Each location further has an edit icon 1022 which links the user to edit location page 1800, an example of which is shown in FIG. 18. Page 1800 permits the user to change the information concerning location (1802), address (1804), estimated cable pull length (1806), number of pulls (1808), wire tag (1810) and/or part number (1812) associated with the cable type connecting to this location. Clicking on update button 1814 will cause the entered data to modify the user's database, clicking on button 1816 will abort any modification, and clicking on button 1818 will delete the location and associated address altogether. Clicking on any of the buttons 1814-1818 exits the user from page 1800 and returns the user to page 1000 (FIGS. 10A and 10B).

Figure 11:
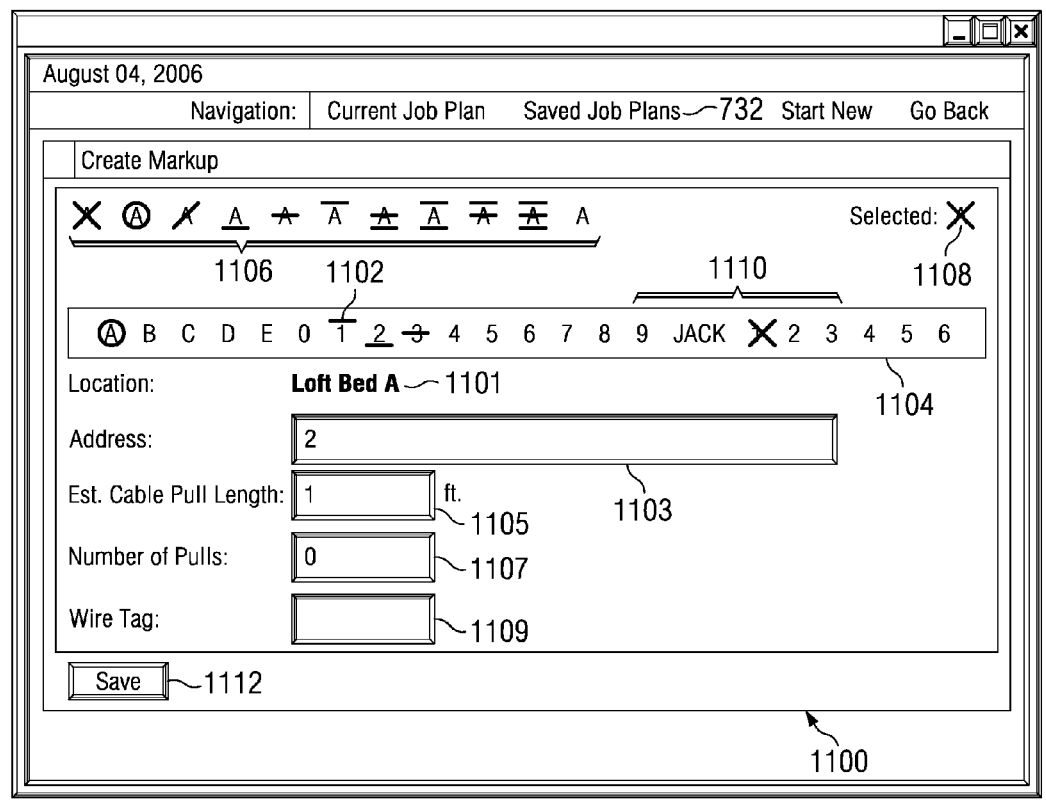
FIG. 11 is a schematic view of a Create Markup page accessed from the page illustrated in FIGS. 10A and 10B.

As seen in FIG. 10A, if a location has had a markup associated with it, it will appear to the right of the address 1016. The illustrated current application/device combination does not have any markups associated with it yet. Therefore, at 1024 there appear "add markup" legends. Clicking on one of these transfers the user to a Create Markup page 1100 (FIGS. 4 and 11).

The create markup page 1100 contains fields 1101, 1103, 1105, 1107 1109 which identify this location/address combination for which the markup is going to be created. The data in fields 1103-1109 may be changed by the user on this page. The page further contains a Javascript tool that allows the user to define a markup scheme. The markup is taken from the "legend" field from the location's part number in table 322 (FIG. 3). The legend code is first separated into words, as split by spaces, and a hidden form field is created for each word. By default, each form value is set to "blank". The legend 1102 is created from the stored blank legend code and is displayed in the canvas area 1104. Above the canvas area 1104 is an array of brush buttons 1106, one of which the user may select by clicking on it.

When the user clicks on a particular brush 1106, the system keeps track of the selected brush by setting an internal variable. The brush selected is displayed at 1108 (here, an "X" brush). When the user clicks on one of the words 1110 in the canvas area 1104, the system applies an image matching the currently selected brush as a background image to the selected word 1110. In addition, the hidden form values corresponding to the selected word (here, a "word" is one of characters A-E, numerals 0-9, "jack" and numerals 1-6) is set to the type of brush 1106 chosen, e.g., "slash", "circle", "X", etc.

When saved at 1112, the legend and hidden form values are merged into a markup code. In the illustrated embodiment a markup code is designated by the following structure:
WORD→TWO COLONS→MARKUP TYPE→TWO EXCLAMATION MARKS Following this pattern a valid markup code would look something like this:

Hello::circle!!World::slash

This would create a markup scheme with the words "Hello World", the "Hello" having a circle around it, and the "World" having a slash through it. Each different cable type or part number will have possibly different words associated with it in table 322 (FIG. 3).

Rather than saving markup data into image files, it is preferred that markup data be stored as markup codes in the database, and only rendered to an image when needed by the system. The image generator preferably uses the PHPGD graphics library, available from www.phpgd.com, to generate images.

The markup image generator first creates a blank image of the appropriate size, by measuring the length of the legend. The code of the design tool then moves through the markup code, printing the text of each word and then an image file corresponding to the markup name on top of it. Based on a parameter passed to it, the image generator displays the markup in a preselected color. In the illustrated embodiment, red is used for the images on screen, while black is used for images that will be printed.

Images are thus created "on the fly" so that a markup image per se is never actually saved to a file. The only exception to this is the PDF generator. The code library used to generate the PDF files requires a valid image file to render a PDF file, so the images are temporarily saved to image files so that they may be included in the PDF files.

Returning to locations and addresses page 1000 (FIG. 10B), in the illustrated embodiment, the user can add up to ten locations 1030 and addresses 1032 in table 1004, and include other data such as pull length 1034, number of pulls 1036, and wire tag 1038. These values are inserted into the database when the add button 1040 is clicked.

Each location in the list may be sorted by arrows 1018, 1020 (FIG. 10A) in the same way as job plan items on the job plan page 700. An edit icon 1022 is also present here and allows the user to modify all of a location's data at page 1800 (FIG. 18). The new values are stored in the database when the update button 1814 is clicked. In an alternative embodiment (not shown) if the location has a markup, the edit page 1800 could also allow the markup to be deleted. This would be accomplished by erasing the data in the markup code field in the location table 330 in the database 320. There is also a button 1818 on the edit page 1800 which allows the user to delete the entire location.

Figure 13:
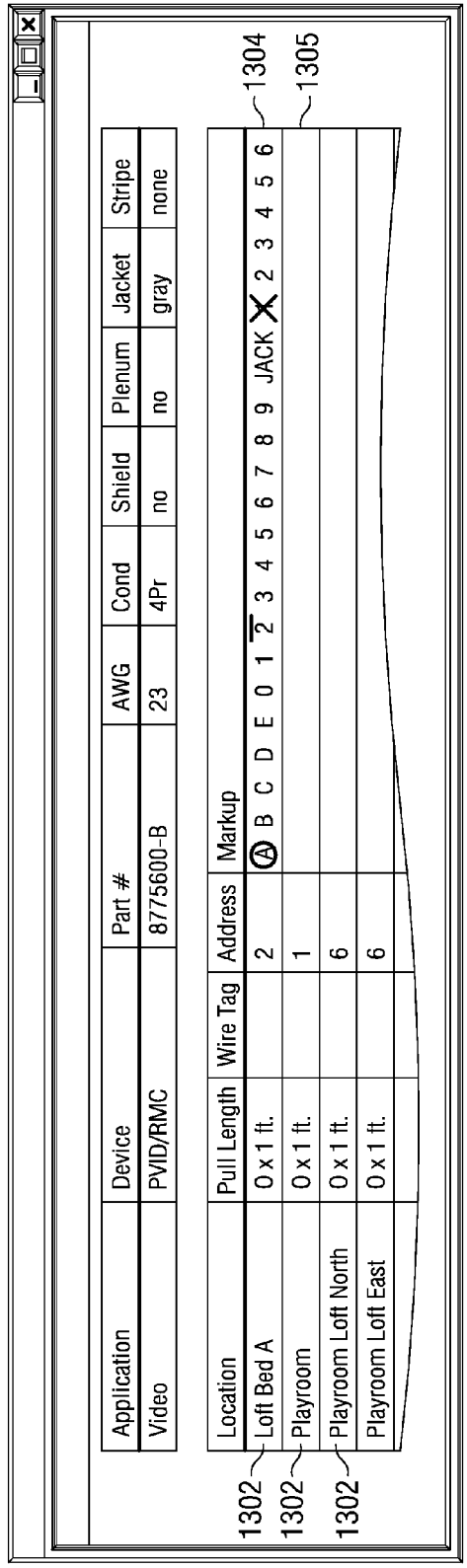
FIG. 13 is a representative and partial image of a second printed output according to the invention, specifying how different lengths or runs of a particular kind of cable are to be assigned, addressed and marked up in a particular job plan.

Returning to the main job plan page 700 (FIG. 7A) the user may click on a print view button 730 to generate, at step 1200 (FIG. 4), a PDF file of the job plan that is sent to the user. Two pages of a representative PDF file are shown in FIGS. 12 and 13. The PDF generator can use the FPDF library (www.fpdf.org) to generate PDF files. The first page of the PDF file (FIG. 12) is a summary, containing much the same information as the main job plan page 700. A page, such as the one shown in FIG. 13, is then created for each job plan item in the job plan, with all of the locations listed at 1302, including their markup images at 1304, 1305 (markup image 1305 currently being blank). Each line corresponds to a particular cable run, and includes the location to which the run is pulled, its pull length and number of pulls, its wire tag and address, and the markup code 1304 to be used on its insulation jacket.

Figure 8:
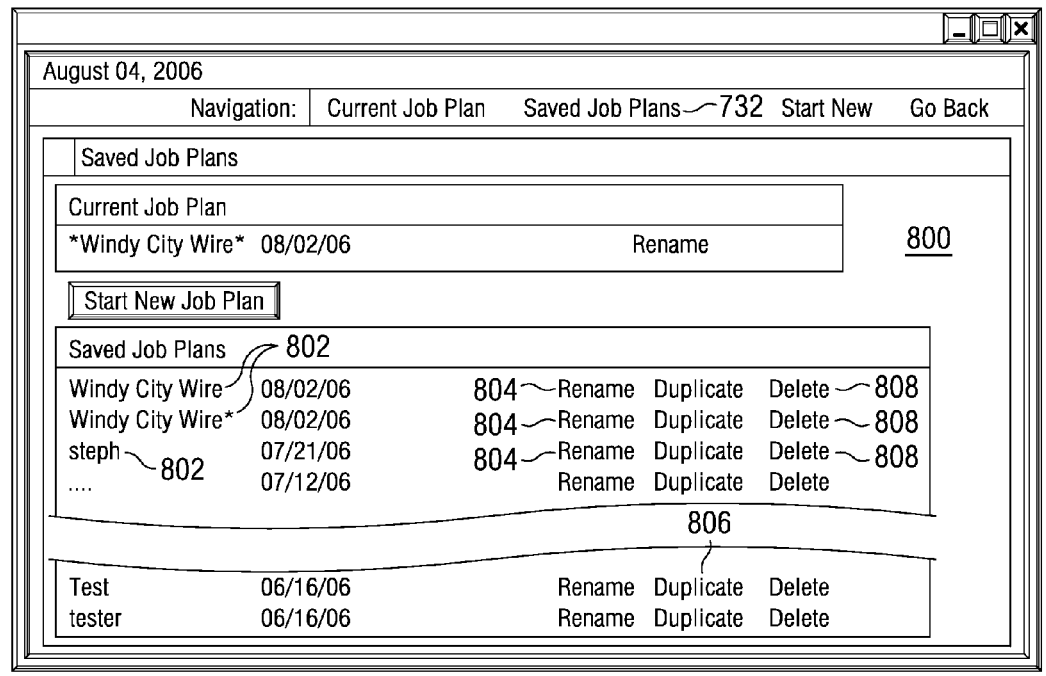
FIG. 8 is a schematic and interrupted view of a saved job plans page accessed from the start page shown in FIG. 5.

Clicking on "saved job plans" at 732 (FIGS. 7A-B, 8, 9, 10A-B or 11) transfers, at step 800 (FIG. 4) the user to a saved job plans page 800 (FIG. 8). The saved job plan page displays all nondeleted job plans 802 the user possesses. It creates this list by listing all job plans with a status other than "deleted". This page also provides the capability to rename job plans at 804, duplicate a job plan at 806, and delete a job plan at 808. Clicking on one of the "rename" legends 804 transfers the user to a rename job plan page 900 (FIG. 9). After entering the desired new name in box 902, clicking on the "rename" button 904 will cause the name field in the job plan table 326 to be updated (FIG. 3).

Page 800 (FIG. 8) can also be used to delete job plans at 808 by changing the "status" flag in the job plan table 326. Finally, the user is able to duplicate job plans from this page at 806. To do this, the system moves through the selected job plan, job plan item, and location tables in turn, copying all values to a new job plan.

A possible definition of the different tables in a relational database 320 (FIG. 3) used to create the job plan follows. In other, nonillustrated embodiments, other relational database architectures may be used to accomplish the same purpose.

Jobplan—Each record in the job plan table 326 contains information about a job plan as a whole. The 'active' field allows the system to tell which of a user's job plans are active, saved or deleted. A job plan usually pertains to a single installation site and can have one or more applications, which in turn are conceptually separable electronic or electrical systems. Each "application" has one or more types of electronic devices, which are sited at different locations.

| Field | Type | Null | Default |
|---|---|---|---|
| Jobplan_id | Int(11) | No | |
| Name | Varchar(50) | No | New Job Plan |
| User_id | Varchar(16) | No | 0 |
| Customer_id | Varchar(50) | No | |
| Active | Enum('yes','no','del') | No | Yes |
| Last_update | Date | No | 0000-00-00 | jobplan_item—Each job plan will contain multiple job plan items, each of which is a record in table 328. A job plan item consists of the combination of an application and a device, coupled with an optional part number. A job plan item corresponds to a cable type; when one orders an "item" one is ordering at least one reel of cable which will be used to make up one or more cable runs in the job.

| Field | Type | Null | Default |
|---|---|---|---|
| Item_id | Int(11) | No | |
| Jobplan_id | Int(11) | No | 0 |
| Partnumber | Varchar(50) | No | 0 |
| Application | Varchar(100) | No | |
| Device | Varchar(100) | No | |
| Sort | Int(11) | No | 0 | location—Each job plan item, in turn, contains multiple locations 330. A location contains a number of editable fields, as well as a field to store the markup code which has been added by the user. A device of a predetermined device type will be sited at a particular location. A cable run of a predetermined cable type ("item") will be used to connect to that device.

| Field | Type | Null | Default |
|---|---|---|---|
| Location_id | Int(11) | No | |
| Item_id | Int(11) | No | 0 |
| Location | Varchar(50) | No | |
| Address | Varchar(50) | No | |
| Length | Int(11) | No | 0 |
| Num_pulls | Int(11) | No | 1 |
| Wire_tag | Varchar(50) | No | |
| Markup | Varchar(255) | No | |
| Sort | Int(11) | No | 0 | partnumber—Part number table 322 contains all the part numbers (different kinds of cables offered for sale by the proprietor of the system) that can be used to specify a job plan item. This list is defined by the proprietor and can be updated by uploading a spreadsheet. Note the "legend" field, where a markup blank is stored; the legend corresponds to preprinted indicia appearing on the cable's insulation jacket.

| Field | Type | Null | Default |
|---|---|---|---|
| Wcw | Varchar(50) | No | |
| Notes | Varchar(255) | No | |
| Awg | Varchar(20) | No | |
| Cond | Varchar(20) | No | |
| Shield | Varchar(20) | No | |
| Plenum | Varchar(20) | No | |
| Jacket | Varchar(20) | No | |
| Stripe | Varchar(50) | No | |
| Legend | Varchar(255) | No | |
| Type | Varchar(50) | No | |
| Keywords | Varchar(255) | Yes | Null |
| GD | Varchar(50) | No | | temp_location—Similar to the location table, temp_location table 332 holds location, address and part number information temporarily when a job plan is created by selecting to enter locations and addresses first. The information in this table is cleared when the job plan is fully created.

| Field | Type | Null | Default |
|---|---|---|---|
| Temp_id | Int(11) | No | |
| Jobplan_id | Int(11) | No | 0 |
| Location | Varchar(50) | No | |
| Address | Varchar(100) | No | |
| Length | Varchar(100) | No | 0 |
| Num_pulls | Int(11) | No | 0 |

-continued

| Field | Type | Null | Default |
| --- | --- | --- | --- |
| Wire_tag | Varchar(10) | No | |
| Partnumber | Varchar(50) | No | |
| Sort | Int(11) | No | 0 | application—Also defined by the proprietor, application table 324 contains default application and device information that appears as part of the user's options. An "application" is an electrical or electronic system that has two or more spaced-apart devices which require connection, usually back to a connection point such as a central hub.

| Field | Type | Null | Default |
| --- | --- | --- | --- |
| Default_id | Int(11) | No | |
| Application | Varchar(50) | No | |
| Devices | Varchar(255) | No | |

Figure 20:
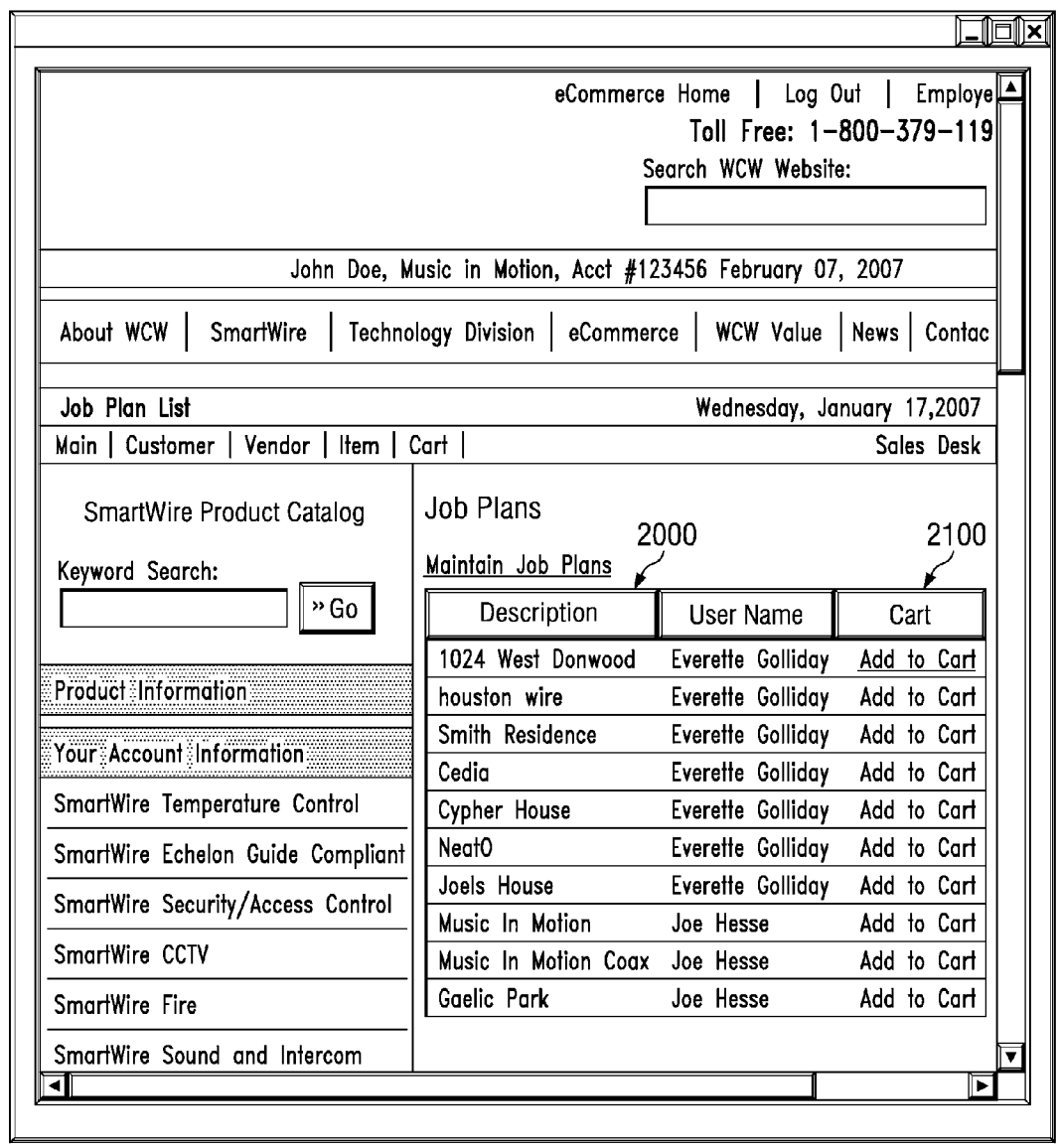
FIG. 20 is a schematic view of a job plan list page.

In addition to the documentation and markup guides, the present invention is also capable of producing preprinted container or box labels for the boxes of cable to be shipped to the customers or to the job site, and wire tags for the cable lengths themselves. One method of accomplishing this is to specify what will be printed on the wire tags and box labels prior to the completion of online checkout, when a user (such as an integrator) is completing an electronically aided purchase of the cable needed for his or her job. In the illustrated embodiment the user starts from an online e-commerce web page which, after login and authentication, will transfer the user to a page like that shown in FIG. 20. At 2000 there appears a drop-down list of all of the user's job plans. Each of the job plans on list 2000 is associated with a respective "add to cart" link 2100.

In response to the user clicking on one of the "add to cart" links, the system will generate a "shopping cart" page such as the one shown in FIG. 21. In the shopping cart page 2200, each item (type of cable) is itemized, together with the total amount of cable needed. The lengths of cable are summed from all of the different pull lengths of the runs of cable type used in this particular job.

Figure 22:
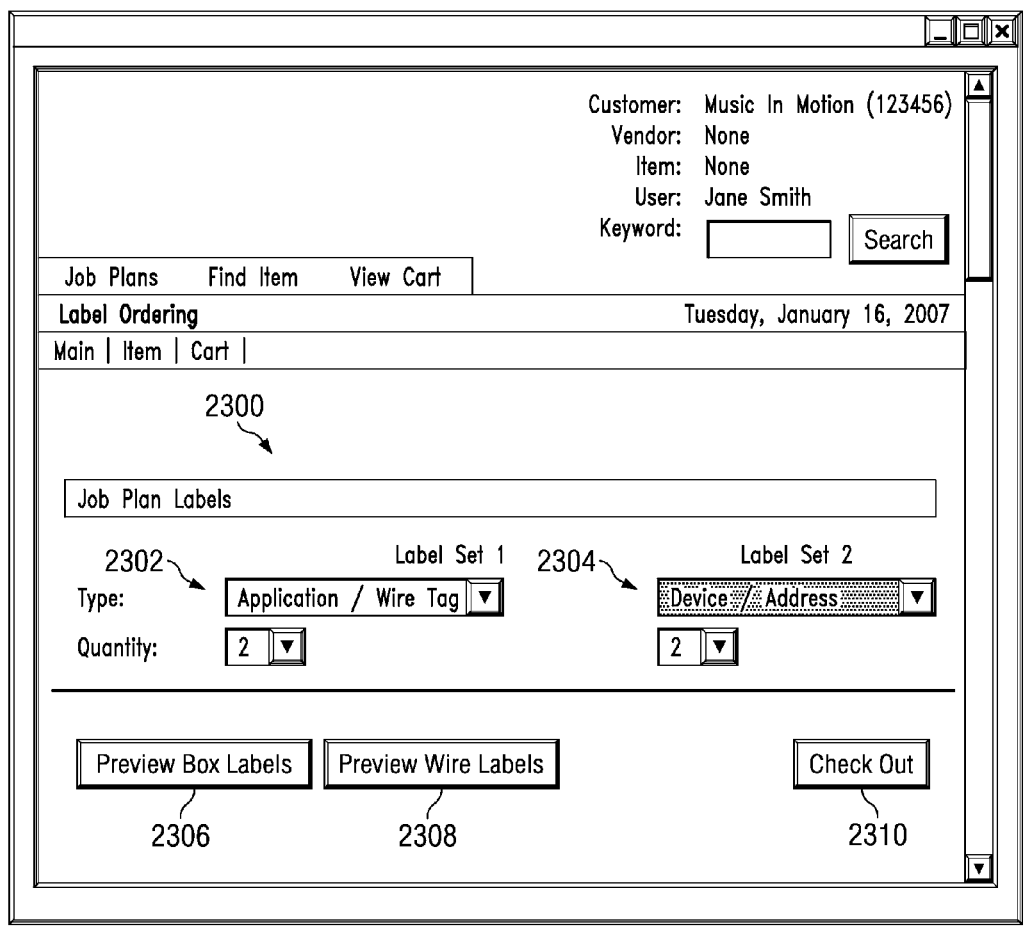
FIG. 22 is a schematic view of a label ordering page accessed from the page shown in FIG. 21.
Figure 23:
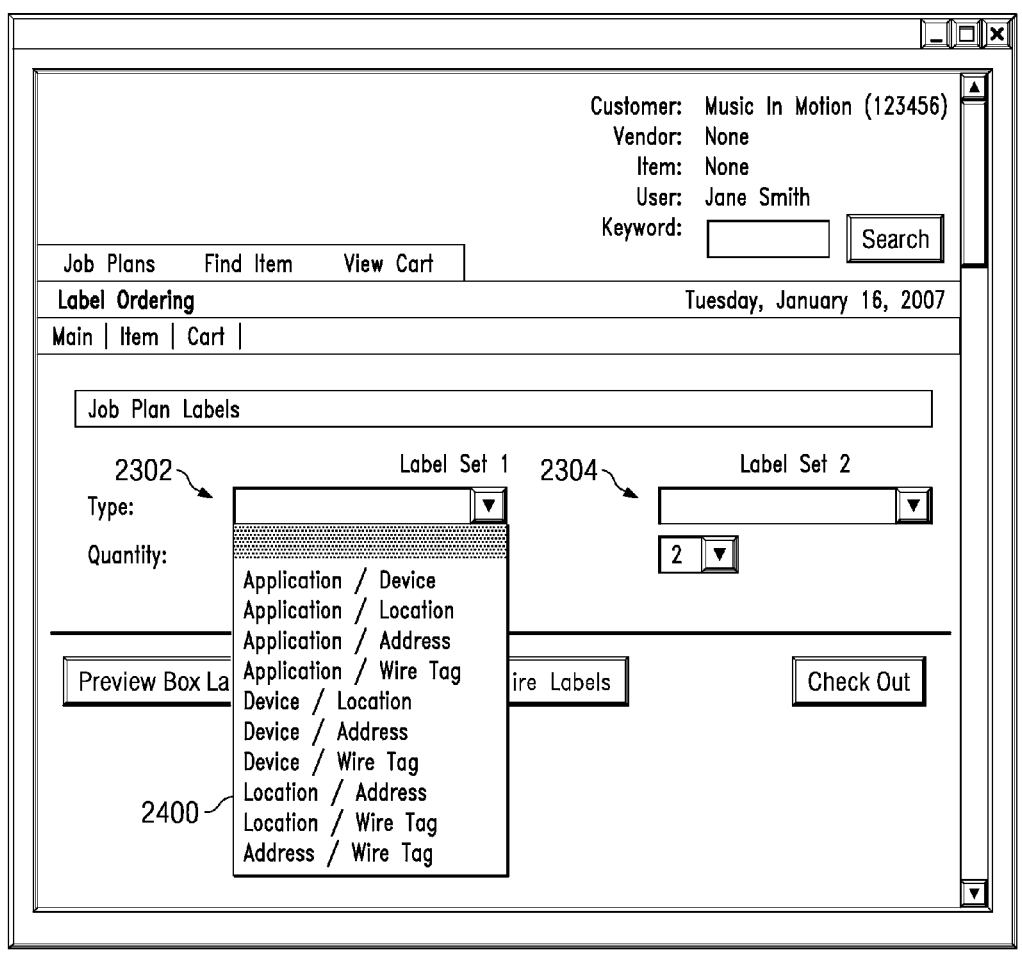
FIG. 23 is a schematic view of a the label ordering page introduced in FIG. 22, but showing a drop-down list of different field pairs.

Clicking on checkout button 2202 transfers the user to a job plan label screen 2300 shown in FIG. 22. At screen 2300, the user or integrator can specify precisely what should be printed on each of two label sets 2302 and 2304, and how many labels in each label set should be printed. The first label set 2302 specifies what should be printed on a box label, an example of which is shown in FIG. 24. This label can be adhered to a box containing a reel of cable prior to shipment to the customer or the job site. The second label set 2304 is used to manufacture preprinted wire tags, a representative sheet of which is illustrated in FIG. 25. In FIG. 23, the user has caused to appear a drop-down list 2400 of possible field combinations for the box or container label. Each of these fields has been stored in database 320 (see FIG. 3) and, upon the selection of a pair of them, will be retrieved and written to predetermined fields in a box label template. The same or a different combination of fields can be selected for wire tags 2304. By clicking on a "preview box labels" button 2306 (FIG. 22), the user can see what the printed box label is going to look like; by clicking on a "preview wire labels" button 2308, the user can see what the set of wire tags is going to look like. After the user is satisfied with what the box label(s) and wire tags will say, he or she can proceed to checkout by clicking on button 2310.

In the representative box label shown in FIG. 24, the name of the job appears at 2500. The item (reel of cable) being shipped in this box appears at 2502 and is identified by several characteristics including part number ("WCW#") 2504, wire gauge (AWG), number of conductors (cond), presence or absence of a shield and/or plenum, and the color of the insulation jacket and stripe. In the illustrated example, this item is to be used for each of three device types 2506, 2508 and 2510, each having several devices at different spaced-apart locations; each of the three device types is being used in a "Control Board" application 2512. Underneath each device type are listed the cable pulls or runs using this cable type, by location and wire tag. To produce the box label shown, the user selected "location/wire tag" from the drop down list 2400 FIG. 23). The box label is adhered to the cable container at the cable vendor or distributor and the labeled container is then shipped to the customer or the job site.

Wire tags for this same cable and job are shown in FIG. 25—but this time, in a box dropping down from "label set 2" 2304 in FIG. 22, the user selected "Device/Wire Tag" as the attributes to appear on each wire tag. A series of wire tags then gets created in an image which gets printed out on peel-off label stock, as shown. These wire tags are typically generated in pairs and in use typically are affixed to each cable pull or run at either end thereof. The wire tags or cable labels are shipped with the product to the customer or to the job site.

While a system, process and medium on which has been prerecorded a computer program have been described for creating a job plan, documentation and labeling therefor for an outside user or integrator, the system also permits these tasks to be done by a sales representative of the cable retailer instead. The end result is shipped to a customer or directly to a job site.

In summary, the present invention provides a design tool which assists the user in specifying and labeling all of the electrical and/or communications cable to be used for a job at a job site. The tool saves time in ordering the cable, provides a series of markup legends which may be used on site for marking up the different runs of cable according the locations to which they are to be pulled, and furnishes comprehensive documentation which can be used to install the cable and service it afterwards.

While illustrated embodiments of the present invention have been described and illustrated in the appended drawings, the present invention is not limited thereto but only by the scope and spirit of the appended claims.

I claim:

1. A system for furnishing insulated electrical cables for a job, the job involving the electrical connection, by a plurality of cable runs each having respective predetermined characteristics, to each of a plurality of devices to at least one connection point spaced from the remote devices, the system comprising:

a relational database storing a plurality of cable types, each cable type having associated therewith a plurality of characteristics;

the relational database further including a job plan record for the job, the job plan record relating, for each device in the job, a cable type to be used to connect the device to the central point and at least one of a device name and a device location;

a display for viewing by a user;

a graphical user interface operable by the user;

a processor linked to the display, the graphical user interface and the relational database, the processor programmed to receive from the user via the graphical user interface a specification of each device which is to be connected in the job, the processor, display and graphical user interface enabling the user to select, from the plurality of cable types, a respective cable type to be used to connect to the last said device;

a memory linked to the processor for storing a label template for each of a plurality of labels to be affixed to respective containers for each cable type to be furnished for the job;

the processor programmed to retrieve, from the relational database, each device for which a cable type will be used in connecting the device to said at least one connection point, the processor retrieving at least one characteristic from the stored characteristics associated with the cable type, the processor generating, from the label template and for each cable type, at least one container label image which includes therein said at least one retrieved cable type characteristic and a list of all devices for which the cable type is to be used; and a printer linked to the processor for printing the cable container labels from the generated images.

2. The system of claim 1, wherein the display and graphical user interface are at a first location, the processor and printer being located at a second location connected to the first location through a network.

3. The system of claim 2, wherein the network is a wide area network.

* * * * *